United States Patent
Pelonis

(10) Patent No.: US 6,731,082 B2
(45) Date of Patent: May 4, 2004

(54) DC MOTOR CONSTANT SPEED PWM CONTROL

(75) Inventor: Kosta L. Pelonis, Taipei (TW)

(73) Assignee: Pelko Electric (HK) Ltd., Hong Kong (CN)

( * ) Notice: Subject to any disclaimer, the term of this patent is extended or adjusted under 35 U.S.C. 154(b) by 62 days.

(21) Appl. No.: 10/097,657

(22) Filed: Mar. 13, 2002

(65) Prior Publication Data

US 2003/0175017 A1 Sep. 18, 2003

(51) Int. Cl.$^7$ ................................................. H02P 6/02
(52) U.S. Cl. ...................... 318/254; 318/138; 318/439; 318/257; 318/258
(58) Field of Search ................................ 318/254, 138, 318/439, 257, 258

(56) References Cited

U.S. PATENT DOCUMENTS

| | | | |
|---|---|---|---|
| 4,208,621 A | * 6/1980 | Hipkins et al. | 318/138 |
| 4,486,692 A | * 12/1984 | Sonoda et al. | 318/258 |
| 5,079,494 A | * 1/1992 | Reichard | 318/811 |
| 5,256,949 A | * 10/1993 | Reichard et al. | 318/254 |
| 6,153,989 A | * 11/2000 | Kardash et al. | 318/254 |

* cited by examiner

Primary Examiner—Rita Leykin
(74) Attorney, Agent, or Firm—Paul & Paul

(57) ABSTRACT

A pulse width modulated (PWM) output signal controller circuit is provided for controlling operation of an electronically commutated, direct current (DC) motor. This DC motor may be used for operating cooling fans in sensitive electronic equipment. The controller circuit maintains the motor speed as constant resulting in a minimizing of the motor power consumption and resultant noise generation. Controller circuit output PWM signals are maintained at a constant pulse width even in the presence of variations in the voltage levels supplied to the controller circuit. The controller circuit includes a current pulse sensor circuit that senses changes in current direction in a motor coil. This current pulse sensor's output is input to a monostable multivibrator circuit that produces a chain of constant height output pulses (PWM signals). This multivibrator circuit output pulses are used to enable and disable a pair of Hall effect-type integrated circuit (IC) output transistors, into alternately conducting and non-conducting states, with only one output transistor conducting at a time. These output transistors are connected to power (drive) a motor coil. A Hall effect device senses the rotor's magnetic field and provides synchronization enable signal to each of the multivibrator circuit driven output transistors. The multivibrator circuit includes a connection to a variable resistor circuit whose value is used to adjust and/or set the width of the output pulses (PWM signals) provided by the multivibrator circuit. The value of the variable resistance may be manually adjusted, which adjustment alters the width of the PWM signals and thereby changes the power delivered to a motor coil. This variable resistor circuit is also automatically adjustable as a function of changes in motor speed sensed. This automatic adjustment maintains a constant width for the PWM signals even in the presence of variations in power supply voltage levels supplied to the multivibrator circuit, which otherwise would change the PWM signals generated and the resultant motor speed.

19 Claims, 6 Drawing Sheets

Waveform to be controlled

Applied control signal

Effective voltage applied to the lead

Waveform to be controlled

Applied control signal

Effective voltage applied to the lead

Timing of Input Pulse and Coil Actuation Pulse

DC MOTOR CONSTANT SPEED PWM
CONTROL

RELATED APPLICATIONS

Not applicable.

FEDERALLY SPONSORED RESEARCH

Not applicable.

Microfiche APPENDIX

Not applicable.

BACKGROUND OF THE INVENTION

This invention relates to an electronically commutated brushless D.C. motor and the pulse width modulated (PWM) control signal generating circuitry used to provide control signals for this motor.

Brushless D.C. motors include a rotating permanent magnet rotor, a stator carrying field coils, and a drive circuit for sequentially exciting the field coils with digital pulses, thereby creating electronic commutation. Electronically commutated motors eliminate or reduce the disadvantages inherent in motors with mechanical structures for a commutator. Specifically, RFI (radio frequency interference) losses and EMI (electro-magnetic induction) losses are reduced or eliminated. Brush and armature maintenance is eliminated, and power consumption attributed to armature-brush arcing is also eliminated.

Typically, an electronic timing drive circuitry incorporating active electronic components, i.e., transistors, FETs (field effect transistors), MOSFETs (metal oxide semiconductor field effect transistors) has been used to provide PWM drive pulses. The PWM drive signal circuit is connected directly to a power supply. Drive pulse generation has been synchronized with rotor position by the incorporation of monitoring or feedback circuitry, including the use of optical position sensors and/or magnet position sensors, such as Hall effect devices.

Many such DC motors are used in electronic applications that may utilize batteries as the energy source. Examples of applications of such battery-powered fans are laptop computers, and telecommunication equipment. More and more, desktop computing devices and non-portable telecommunication equipment are being backed-up by arrays of batteries. Therefore, this equipment must be designed to operate on battery power.

When batteries are used to power such equipment, it is desirable that this equipment be very efficient, so that there is a minimum of energy consumption. This has become an important design requirement for cooling fans that are used in such battery-powered equipment. It has become important that these fans, and the motors that power them, be designed for efficiency and for minimum energy consumption. It is also desirable that fan motors used for cooling telecommunications equipment provide maximized airflow to pressure characteristics, with a minimum of noise and DC power consumption.

In systems situations, such as telecommunications systems, batteries are used in the system and charged while the system and the battery driven equipment is in operation. Sometimes, the batteries are charged to a higher voltage than the nominal value required for the equipment. Examples of this are the lead-acid batteries used in telephone centers. In the presence of power shortages, or blackouts, these batteries may discharge to a voltage value below the rated voltage for the system. As an example, battery banks rated at a nominal working voltage of 48 volts, may be permitted to swing between 40–56 volts. Under severe load conditions, additional batteries may be added to a bank (which increases its operating voltage). Under such conditions, a nominal bank output voltage may be permitted to swing between 60–72 volts.

If a DC fan motor rated at 48 volts were installed in the system where the battery bank operated between 60–72 volts, the motor would consume excessive power. It would also produce and excessive amount of noise. Motor controller electronics and coil driver power transistor switching circuits may be subjected to overheating and burnout. Even when the battery bank operates about its nominal voltage value, there may be a considerable voltage swing to which a motor is subjected. It is therefore desirable to provide a DC fan motor that will maintain a constant speed and operate under minimum power consumption under power supply voltage variations.

While the variations recited above were directed to battery powered systems, voltage variations can occur even with regulated power supplies operating from ac current. Moreover, power surges are not unheard of with these ac powered-dc supplies. Such power surges manifest themselves as voltage variations. Therefore, a constant speed motor circuit is also desirable in ac powered dc supply systems.

PWM control pulses are of fixed height and frequency and are of variable pulse width. As the pulse width varies so does the power delivered to the motor coils. As the power varies, so does motor speed. Erratic motor speeds increase power consumption, can create more heat, and create electrical noise.

Excessive supply voltages and variations in supply voltage, whether originating with batteries or not, will result in changes in the PWM signals produced. These changes have occurred in prior PWM controller circuits when erratic voltage levels, drifting voltage levels, and voltage spikes have been incurred. It is desirable that the effects of these changes be avoided.

In prior circuits, the PWM motor drive is used to switch on and off the incoming energy source in order to control the current (or voltage) supplied to a load (motor coil). Generally higher frequency pulses have in the past been utilized in the generation of PWM control pulses. The frequency used to carry the pulses of variable width (PWM) has been higher than the frequency of the waveform that needed to be controlled.

The PWM technique has been widely used to control the power supply voltage applied to a DC fan motor in order to control fan speed. Chinomi, et al. (U.S. Pat. No. 6,256,181 B1) disclose a pulse width modulated (PWM) motor drive circuit. Chinomi changes the drive pulse rate by controlling (changing) drive pulse width. Erdman, et al. (U.S. Pat. No. 6,271,638 B1) use a capacitor-coupled bridge circuit power supply to further reduce power consumption. Erdman further uses a Hall sensor control of the pulse generator to limit current usage. Erdman uses a stall sensor to deactivate the field coil driver pulse circuitry in the presence of a stall and fault condition.

Horiuchi, et al. (U.S. Pat. No. 5,969,445), have used a brushless motor, incorporating a sensor magnet for sensing rotor position. This sensor magnet provides a feedback signal indicative of each rotor pole position and thereby the rotational speed of the brushless motor. The Horiuchi drive circuit, which creates electronic commutation, incorporates FETs, and obtains power from a power supply containing an AC-to-DC converter. The Horiuchi sensed rotor position signal is used to optimize the drive pulse effects as a function of pulse generation timing (i.e. leading and/or falling edges) verses rotor magnet position.

Schmider, et al. (U.S. patent application Pub. 2001/000 4194), use bi-stable multivibrator circuits for implementing the electronic commutation of the motor's field magnets. One or more comparator circuits control the switching state of the multivibrator. The Schmider comparator circuit is controlled by a voltage induced in a field coil which has just been deactivated. The need for a separate rotor position sensor is eliminated.

Hall effect devices (Hall generators) have been substitute for the Horiuchi-type magnet sensor (U.S. Pat. No. 6,211, 635 B1, Kambe, et al.). Kambe uses a single Hall generator in his motor to determine rotor position and to generate synchronization signals for the drive pulse circuit operation.

In the use of PWM digital drive pulses, a current spike or over voltage can occur at the time of or shortly after each coil current transition time. Shunt or snubber circuits have been used to protect the drive circuitry from these spikes. These devices limit over voltage or over current transients, during or after the operation of switching current (leading edge or falling edge of a pulse) in a field coil. Snubber circuits are shown in Markaran, et al. (U.S. patent application Pub. 2001/0000293 A1). Both Markaran's field coil switch and his snubber circuit switch are implemented by MOSFETs. When Markaran's field coil is turned off, by the opening of his in-line switch (drive pulse driver circuit switch), the residual energy in the field coil begins to drain through the snubber diode into his snubber capacitor. When the voltage on that snubber capacitor reaches a certain level, the snubber MOSFET is turned on (the snubber switch is closed) and the voltage on the snubber capacitor begins to drain through the snubber inductor to the positive voltage node (to the power supply).

Alvaro, et al. has taken a different approach to protecting the drive pulse switching circuit (U.S. Pat. No. 6,239,565 B1). He places a capacitor (RC series circuit) between the driver circuit (drive pulse driver circuit switch) and ground (the negative node). This limits the voltage that can appear at the positive node due to back EMF or field coil discharge.

While the use of PWM control signals to control fan operation has been a popular technique, there have been some disadvantages to using this technique. These disadvantages have included that some fan motor controllers require a PWM input, where the user must provide an external signal of variable pulse width. This has required the user to provide an additional external circuit to achieve the desired speed control which adds to the cost and the size of the structure.

Additionally, the high frequency switching which is required for PWM control contributes to switching losses especially at higher DC voltages. Furthermore, the higher frequencies contribute to greater electromagnetic interference. It is desirable to reduce or eliminate these factors from a PWM controller circuit.

A further disadvantage has been that sophisticated circuitry has been required to synchronize the generating (carrier) pulses with the control signal generated by a position sensor, such as a Hall effect sensor (Hall generator). This synchronization is particularly critical at lower motor speeds so that smooth fan operation (motor rotation) occurs.

Lastly, where PWM signals are generated within the fan motor circuitry itself, there is incurred increased expense. The generation of accurate and stable PWM signals has generally been an involved task. Previous PWM signal generation circuitry located within the motor circuitry itself has required an external resistance or the input of an externally generated voltage in order to vary not only the pulse width, but also its frequency. In some instances there have been space and heat dissipation constraints.

An object of the present invention is to provide an improved PWM controller circuit for constant speed control of an electronically commutated fan motor, whereby power losses are reduced and energy consumption minimized.

A second object is to provide a constant speed PWM controller circuit that maintains constant motor speed in the presence of power supply voltage variations.

A further object is to provide this PWM controller circuit with constant output in the presence of voltage spikes, erratic voltage levels, and drifting voltage levels.

Another object is to provide this PWM controller circuit output which does not need the input of an additional external circuit of variable pulse width, and does not need high frequency switching to product the PWM control, thereby reducing switching losses and electromagnetic interference.

SUMMARY OF THE INVENTION

The objects are realized in a controller circuit for an electronically commutated (brushless) DC motor, having a reduced component count. This controller circuit includes circuitry that generates pulse width modulation (PWM) control signals for the activation of the motor field coil(s). These PWM control signals do not change with variations in supply voltage, nor in the presence of voltage spikes or erratic voltage levels, thereby producing constant speed motor operation. Power losses are reduced and energy consumption minimized. The PWM control signals are generated without the need for high speed switching or external circuitry generated variable pulse with input signals.

The rotation of the rotor's magnetic field is detected by a Hall sensor (Hall generator circuit) which senses rotor position and speed and provides synchronizing pulses. A pair of Hall effect integrated circuit (IC) implemented output transistors provide the excitation current to a motor coil, bilaterally (in alternating directions) by alternately conducting and non-conducting, with only one output transistor conducting at a time. Depending upon the power capacity selected for these output transistors, which in turn is related to the power needed to drive the motor and the power limitations of the PWM controller circuit, a separate bridge circuit may be utilized.

Where a bridge circuit is used to directly power a motor coil from a power supply, the output transistors are used to trigger the operation of the bridge circuit. That bridge circuit includes power-switching transistors, whose alternating conduction states bilaterally excite a motor coil. The conduction states of the bridge circuit, switching transistors are then controlled by the outputs from the IC output transistors. With small motors, such as those used to drive cooling fans in small electronic devices, such as laptop and desktop computers, the output transistors are connected to directly excite a motor coil. The synchronizing pulses from the Hall sensor are input to the output transistors to synchronize their operation with the instantaneous physical relationship of the rotor poles with a motor coil.

A pulse current sensor circuit senses the change in current direction, i.e., the bilateral operation of a coil. The output of this coil current pulse sensor is input to a monostable multivibrator circuit. The output of this monostable multivibrator circuit is PWM signals, which are sent to the IC output transistors to control their respective conduction states. The pulse current sensor circuit provides a feedback signal to the circuit.

The width of the pulses produced by the monostable multivibrator circuit is established by a resistance circuit, which implements the time constant circuit portion of the monostable multivibrator circuit. This resistance circuit is physically located external to the monostable multivibrator circuitry. It has a manual adjustment whereby a user manually sets the pulse width and therefore the desired motor speed. It also has an automatic adjustment portion, which compensates for variations in supply voltage levels.

The automatic variations in resistance values in this resistance circuit act to compensate for voltage irregularities by providing a consistent time constant within the monostable multivibrator. The pulse width of the PWM signals from the monostable multivibrator is thereby unaffected by changes in supply voltage as there is a compensation for voltage differences.

Supply voltage changes normally, ultimately, change motor speed. The purpose in compensating for supply voltage changes is to keep the motor speed constant. Therefore, implementation of the automatic compensation within the resistance circuit utilizes a feedback signal of instantaneous motor speed. The resistance circuit includes a voltage difference circuit with an output to a voltage controlled resistor. The voltage controlled resistor forms a portion of the time constant circuitry within the PWM monostable multivibrator circuit. The voltage difference circuit measures the difference between a set reference voltage and the output voltage from a peak value detector. This peak value detector is driven from a signal generated from the coil current pulse sensor, which is first processed through a reset monostable multivibrator and then an integrator circuit which inputs the peak value detector.

BRIEF DESCRIPTION OF THE DRAWINGS

The features, advantages and operation of the present invention will become readily apparent and further understood from a reading of the following detailed description with the accompanying drawings, in which like numerals refer to like elements, and in which.

DETAILED DESCRIPTION OF THE INVENTION

The present invention is an improved constant speed pulse width modulated (PWM) signal controller circuit for an electronically commutated (brushless) D.C. motor. This circuit includes a motor speed feedback circuit which initiates a voltage compensation for keeping motor speed constant in the presence of voltage variations which otherwise would change motor speed. This circuitry eliminates the need for externally provided pulses in the generation of PWM signals.

Figure 1A:
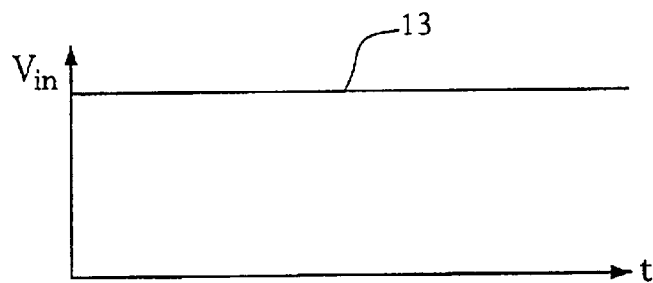
FIG. 1a voltage level (wave form) to be controlled for prior PWM signal generation circuits for motor drives.
Figure 1B:
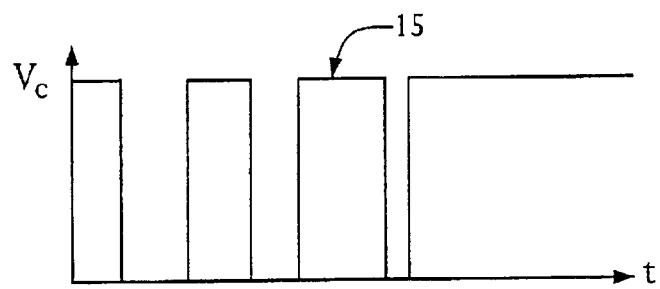
FIG. 1b shows and externally generated applied control signal for prior PWM signal generation circuits.
Figure 1C:
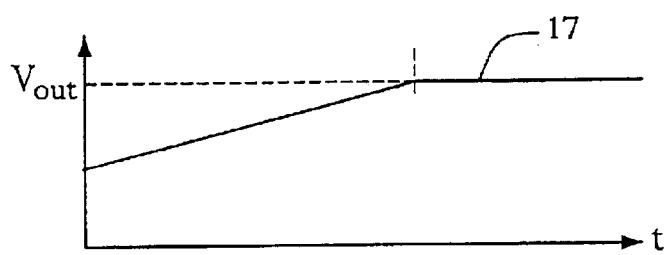
FIG. 1c shows the effective voltage applied to the load in prior PWM signal generation circuits.
Figure 1D:
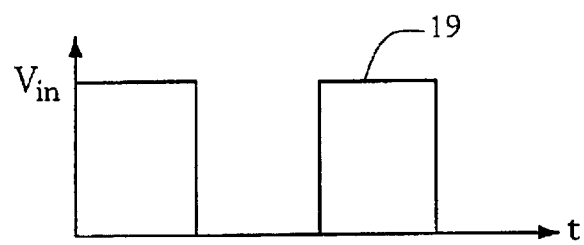
FIG. 1d shows a second prior wave form to be controlled, this being a square wave.
Figure 1E:
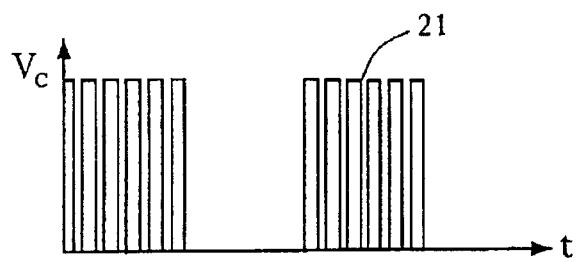
FIG. 1e shows a second externally generated applied control signal for this second PWM signal generation circuit.
Figure 1F:
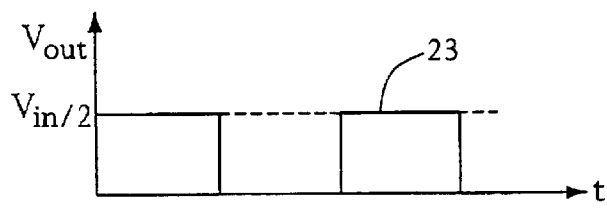
FIG. 1f shows the effective voltage applied to the load in this second PWM signal generation circuit.

In some previous PWM motor signal circuits, a voltage level 13, FIG. 1a, would be controlled, by applying externally generated pulses 15 of increasing successive widths, FIG. 1b. The resultant effective voltage applied to the load (motor coil) is a ramp function 17, FIG. 1c. In other prior PWM motor signal circuits, an externally generated waveform 19, FIG. 1d, is provided to be thereafter controlled. The control signals are high frequency pulses 21, FIG. 1e, which are gated through to time the desired pulse width of the PWM signals. The resultant effective voltage applied to the load (motor coil) is a series of square waves 23, FIG. 1f, being PWM control signals.

Figure 2:
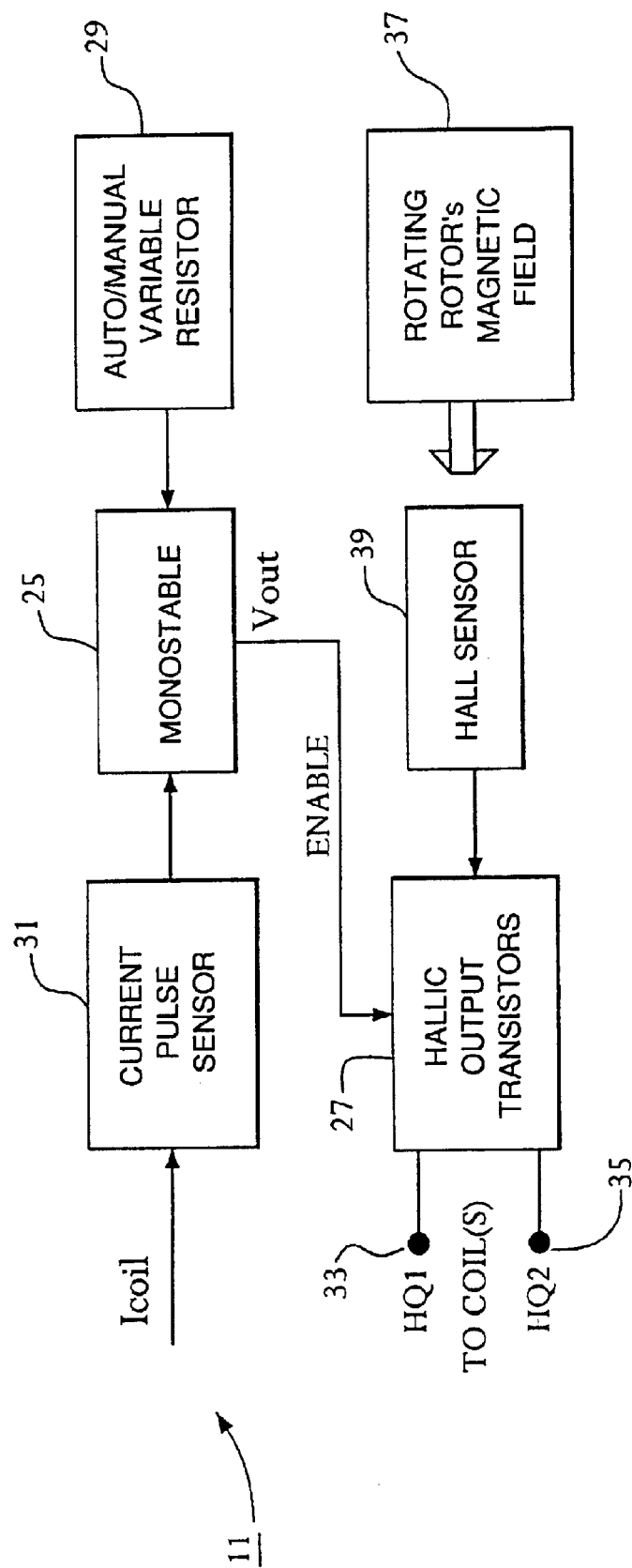
FIG. 2 is a block diagram of the constant speed PWM control circuit of the present invention.

The present invention, FIG. 2, provides square wave PWM control signals without the need for externally generated signals 15 and without the need for high frequency pulses 21. A voltage level is used as the initial waveform. The PWM constant speed controller circuit 11, of this invention, FIG. 2, uses a monostable multivibrator 25 to generate square pulses which enable a pair of Hall effect IC (integrated circuit) output transistors 27. These output transistors are connected to the monostable multivibrator 25 output to be controlled in alternate conducting and non-conducting states, with only one output transistor 27 in a given state at a time.

The monostable multivibrator 27 includes a time constant circuit which sets the pulse width produced. This typically is an RC (resistor-capacitor) circuit. An external variable resistance 29 is connected into the monostable multivibrator 27 as the resistance for its time constant. This resistor 29 is adjusted manually by the user to set the desired speed of the motor. It is automatically varied, as described below, to compensate for variations in voltage levels which would otherwise result in changes in motor speed.

The monostable multivibrator 25 is triggered by an input signal from a current pulse sensor circuit 31. This current pulse sensor 31 detects the changes in current direction in a motor coil. The output signals on the respective first and second output nodes 33, 35 from the two output transistors 27 are used to drive a motor coil bilaterally, i.e., with current alternately flowing in opposite directions. The change in direction of the current through a motor coil creates the current pulse sensed by the sensor 31.

The rotating rotor of the motor generates a rotating magnetic field 37, which is sensed by a Hall effect sensor 39. The output from this Hall sensor 39 is used as a synchronizing input signal to the Hall output transistors 27.

Figures 3, 4:
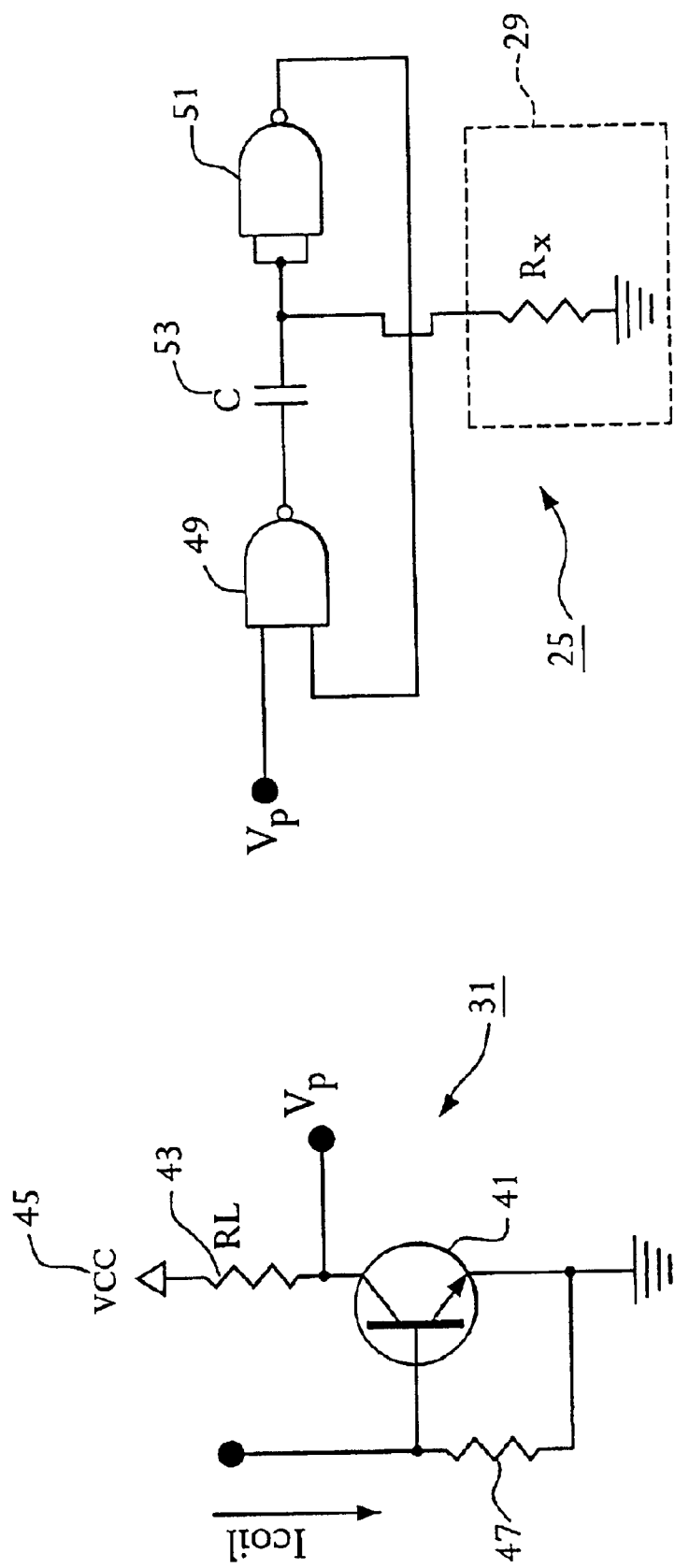
FIG. 3 shows the coil current pulse sensor circuit of FIG. 2.
FIG. 4 shows the monostable multivibrator circuit of FIG. 2.

The circuit implementation of the current pulse sensor circuit 31 includes a NPN transistor 41, FIG. 3. This transistor 41 is connected on its collector through a first biasing resistor 43 to a reference voltage 45. The current pulse from a motor coil is input to the base node of this sensing transistor 41 and also through a second biasing resistor 47 to ground. A coil pulse will cause the sensing transistor 41 to temporarily conduct, which places a negative going pulse at the collector of the transistor 41. This negative going pulse is the reset signal input to the monostable multivibrator 25.

The monostable multivibrator 25 is implemented with a pair of series connected inverted output AND gates 49, 51, FIG. 4. Unless being reset, this monostable multivibrator 25 is a free running device. The first gate 49 has one input from the collector node of the sensing transistor 41 (FIG. 3), and its second input as the feedback of the output from the second gate 51. The output from the first gate 49, passes through the time constant capacitor 53 to both input nodes of the second gate 51. The input nodes of this second gate 51 are also connected to ground though the time constant resistance 29, shown in both FIGS. 2 and 4.

Figure 5A:
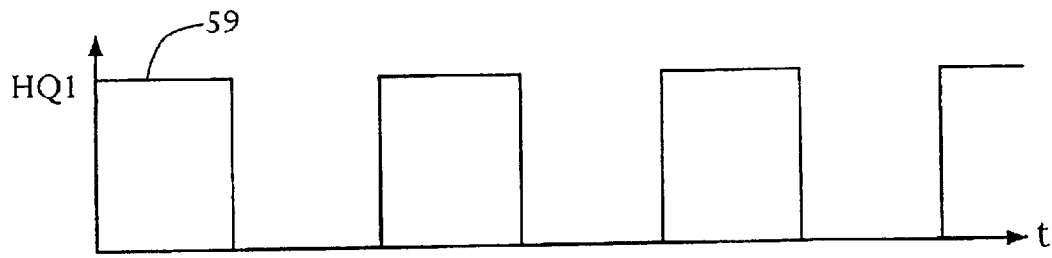
FIGS. 5a–5e show the Timing of Input Pulse and Coil Actuation Pulse
Figure 5B:
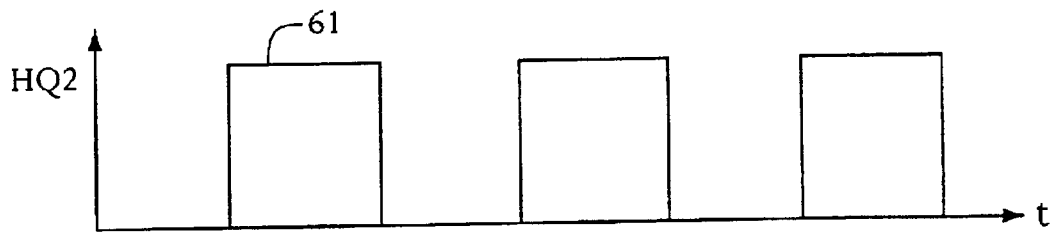
Figure 5C:
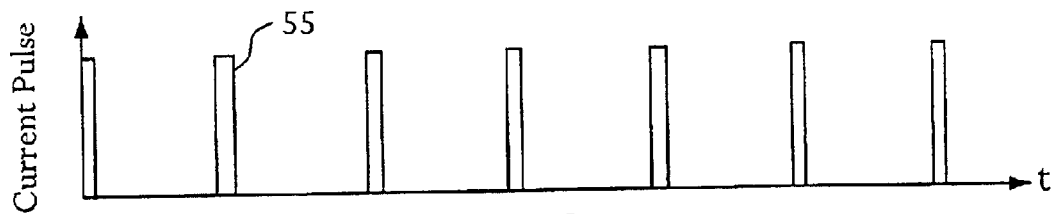
Figure 5D:
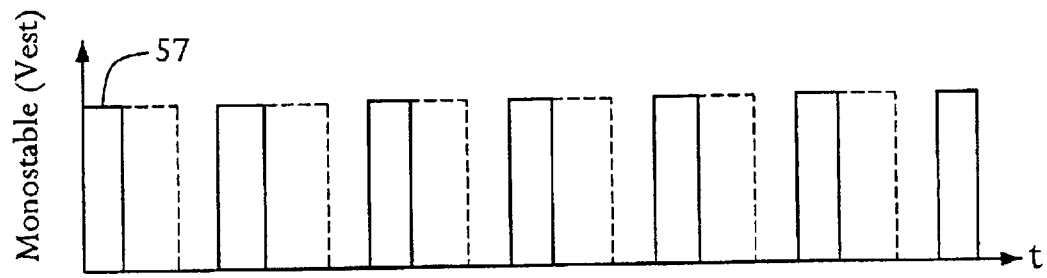
Figure 5E:
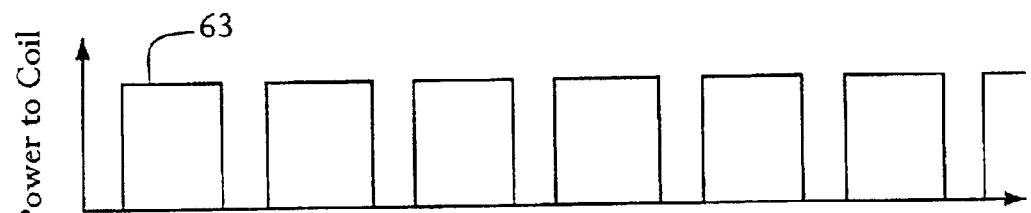

FIGS. 5a–5e illustrates the pulses at various portions of the circuitry of FIG. 2. The coil pulses, i.e., the coil current pulses 55, are shown in FIG. 5c. The output pulses 57 from the monostable multivibrator 25 are illustrated in FIG. 5d. The output pulses 59 at the first output node 33 (FIG. 2) being the output from the first output transistor 27 are shown in FIG. 5a. The output pulses 61 at the second output node 35 (FIG. 2) being the output from the second output transistor 27 are shown in FIG. 5b. The power to the coil are the pulses 63 shown in FIG. 5e.

The sensing transistor 41 momentarily turns on in as the output nodes 33 and 35 change state as illustrated by the respective pulses 59, 61. These changes of states produce the sensed current pulses 55. The output pulses 57 from the monostable multivibrator 25 enables and disables the transistor outputs at nodes 33, 35. The pulse width of the enabling signals 57 can vary by varying the resistance circuit 29. Among others this external resistance may be implemented with a manually adjustable passive resistance (rheostat) or with a NTC thermistor, in which case the pulse width will vary with temperature. This resistance can also be adjusted as a sensed speed compensator circuit as discussed below.

After every change due to a rotor rotation sensed by the Hall sensor 39, the monostable multivibrator 25 will dictate the off time of the outputs 33, 35 of the output transistors 27. The larger the pulse width from t1 to t2, FIG. 5d, the less is the power allowed to a coil, i.e., the narrower are the power pulses 63, FIG. 5e.

The invention eliminates the need from noise generating high frequency pulses in the present PWM control circuit. The frequency of rotation as sensed by the Hall sensor 39 is used to trigger (synchronize) the precise pulse rising and falling edge locations. Switching losses previously incurred with prior circuits are minimized, especially in high voltage applications. Elaborate synchronization circuits are eliminated. Circuit count is reduced.

Figure 6:
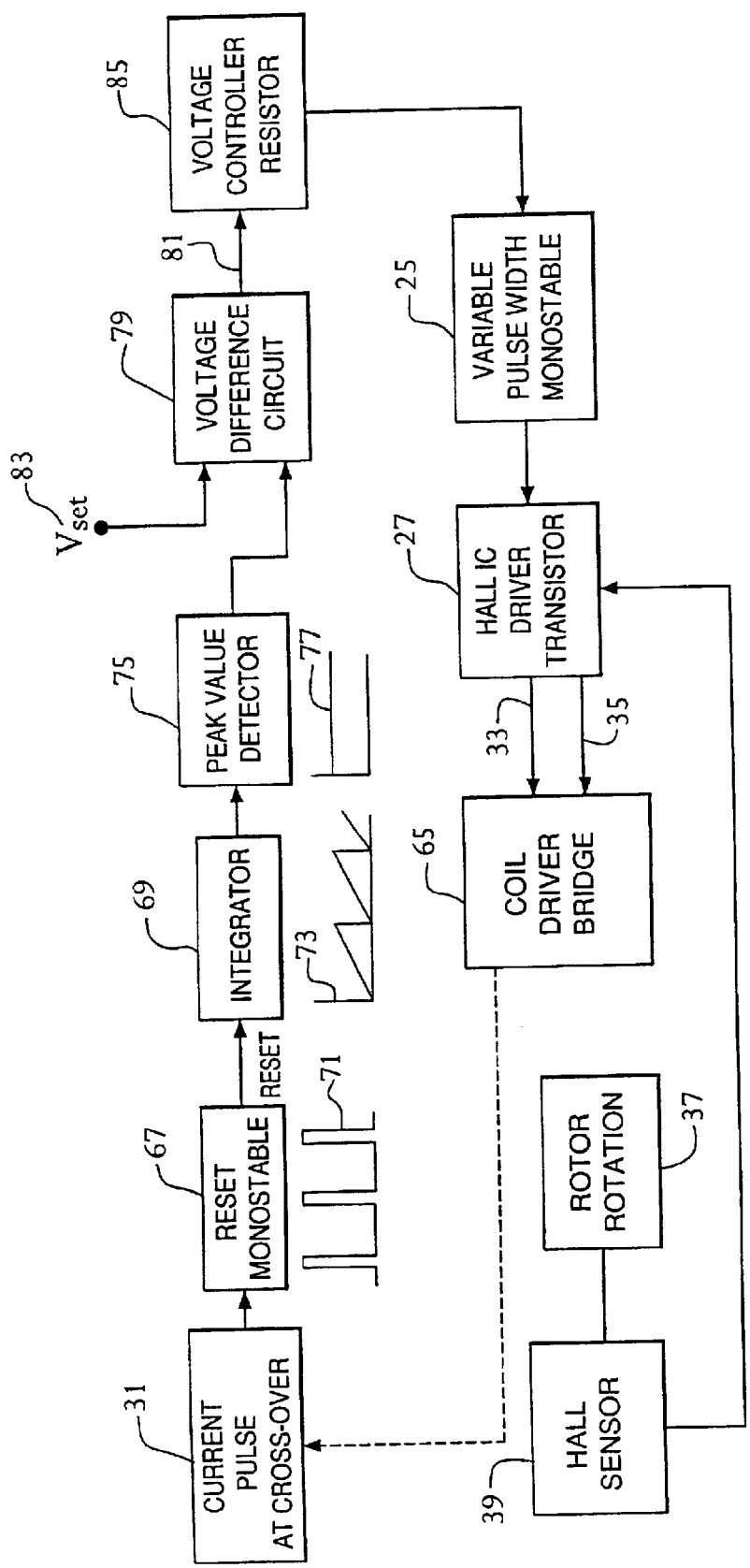
FIG. 6 is a block diagram of the constant speed PWM control circuit with a more detailed block diagram of the speed compensation variable resistance circuitry.

FIG. 6 shows the speed-controlled resistance implementation combined with the components described in connection with FIG. 2. Rotor rotation 37 is sensed by the Hall sensor 39 to provide a synchronization signal to the Hall IC output transistors 27. The output nodes 33, 35 from these output transistors 27, FIG. 6, are connected to a coil driver bridge circuit 65. This driver circuit 65 is connectable to a motor coil.

The variable pulse width pulses from the monostable multivibrator 25 are connected as an input to the Hall IC output transistors 27. The external resistance circuit, which can compensate for changes in motor speed to provide pulse width adjustments and thereby keep motor speed constant, is connected between the current pulse sensor 31 and the monostable multivibrator 25.

The activation signals provided by the coil driver bridge circuit 65 are monitored by the coil current pulse sensor 31. The output from the coil current sensor 31 is input to a second monostable multivibrator 67, whose output is enabled by the signal from the current pulse sensor 31. The second monostable 67 is used to clean up the pulses from the sensor 31. The second monostable multivibrator 67 has its output connected to an integrator circuit 69, which changes the pulses 71 provided out of the second monostable 67 into sawtooth signals 73. The output from the integrator 69 is connected to a peak value detector 75 that provides a voltage level 77 out as a function of the pulse frequency of the sawtooth signals 73. The voltage level 77 from the peak value detector circuit 75 varies with the sensed motor speed.

A voltage difference circuit provides a voltage output 81 as a function of the difference between the voltage level 77 provided out of the peak value detector, and a reference voltage 83. This output 81 drives a voltage-controlled resistor circuit 85, which is connected into the time constant portion of the variable pulse width monostable multivibrator 25.

As the speed of rotation decreases, the DC voltage 77 output from the peak detector 75 increases. The voltage difference circuit 79 will present to the voltage-controlled resistor circuit 85 the difference between the voltage from the peak detector 75 and the preset reference voltage 83, which is selected by the user and represents the desired speed of rotation. The voltage-controlled resistor, such as a MOS FET device, will vary its resistance as a function of input voltage to it. This device provides the resistance 29 discussed in connection with FIG. 4.

Figure 7:
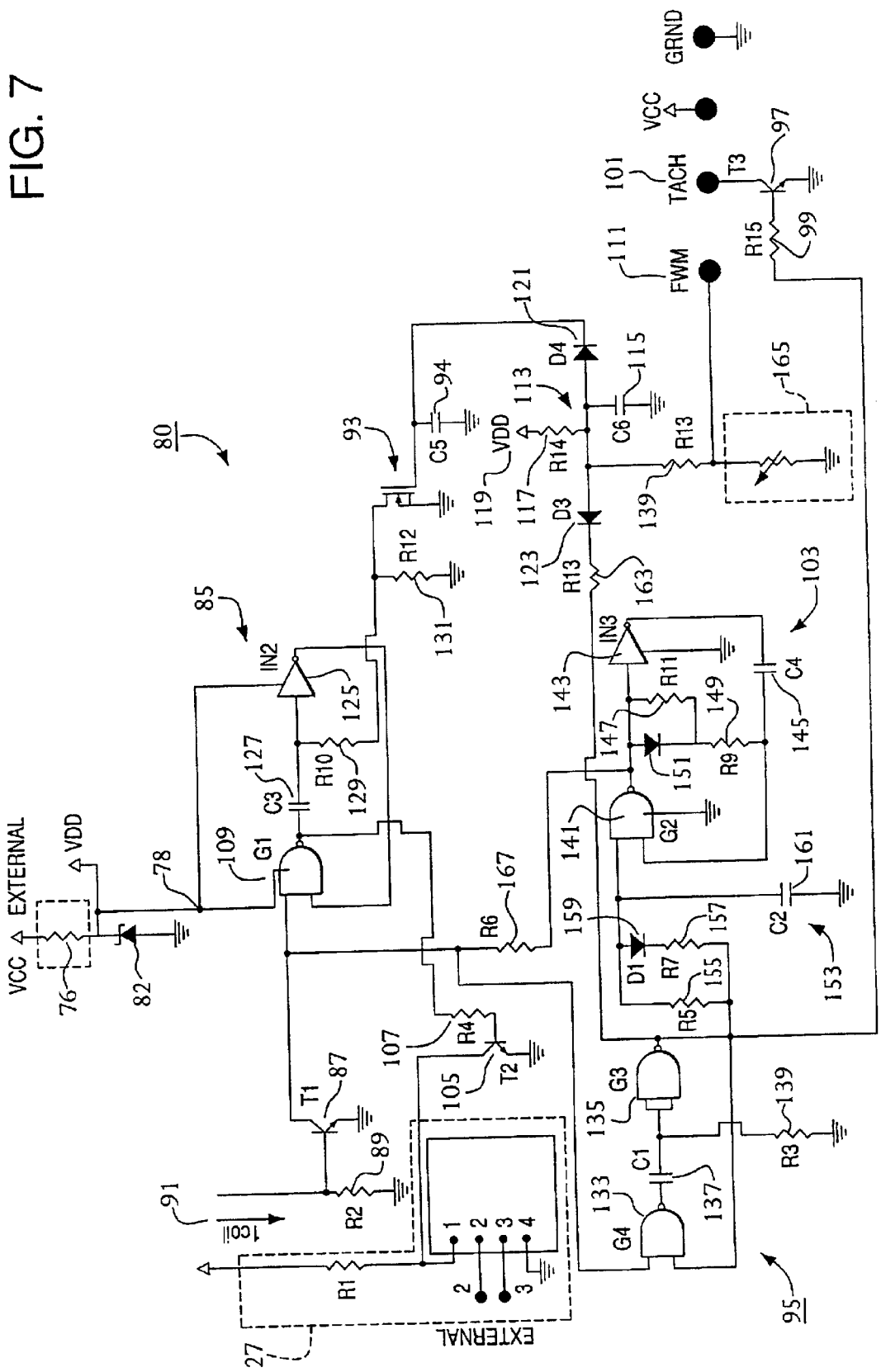
FIG. 7 is a circuit diagram of the circuit shown in block representation in FIG. 6.

FIG. 7 shows a circuit 80 used to control the speed of rotation of a DC motor at a selected value and independent of power supply variations. It is understood that the selected speed cannot exceed the maximum speed that the DC motor can deliver. A D.C. power supply supplies a voltage at terminal 78 through and external series resistor 76. A Zener diode 82 is connected in series with the load resister 76 to establish the supply voltage for the circuit 80. This voltage is established by the particular value for the Zener diode 82 selected and value of the load resistor 76.

The Hall IC output transistors 27 are connected as it is in FIG. 2. A multivibrator circuit 85 provides a pulse output as a function of a pulse received from the current pulse sensor transistor 87. This current sensing NPN transistor 87 is connected on its collector node to the input of the multivibrator 85 and on its emitter node to ground. A biasing resistor 89 is connected between the base node of this transistor 87 and ground. The coil current pulses 91 are connected to the transistor 87 base node.

The output of the monostable 85, which is the NAND gate 109, is connected to the input of the transistor switch 105 through resistor 107. Transistor 105 conducts on every pulse generated at the output of gate 109 and for the duration of that pulse. Transistor switch 105 disables the output stage of the Hall IC, thereby shutting off the current supply to the motor coils for the duration of the pulse produced by monostable 85. By varying the resistance of the resistor network 129, 131 and RDS channel resistance of MOSFET 93 we can change the motor speed. An increase of the RC time constant of monostable 85 will decrease the motor speed.

Monostable 95 performs reset and synchronizing functions. This monostable 95 has a fixed time constant consisting of capacitor 137 and resistor 139. The input of this monostable 95 is the output of the current sensing switch 87 provided that the astable multivibrator 103 is idle (its output is high). When the input of gate 141 connected to capacitor 161 is low the output of gate 141 is high and the input of monostable 95 from gate 141 through resistor 167 is controlled by the output of the current sensing transistor 87. If the output of gate 141 is low then the input of monostable 95 is not controlled by the output of the current sensing transistor 87. Under normal running conditions current pulses are triggering transistor 87 which in turn triggers monostable 95 and which in turn produces pulses of fixed width (set by capacitor 137 and resistor 139) at the output of the inverter 135 (two input NAND configured as inverter). The output of inverter 135 goes low on every current pulse and performs three functions: (i) turns off for a short time transistor 97 thus providing an output pulse which is sensed by external circuitry for the purpose of counting the speed of the motor (TACHOMETER OUTPUT); (ii) discharges capacitor 115 through diode 123 and resistor 163 at the every crossover transistor switching; and (iii) discharges capacitor 161 through diode 159 and resistor 157.

It must be noted that the output of gate 135 is kept low typically for about 5% of the time during normal motor running conditions. The rest of the time the output is kept high and: (i) TACHOMETER transistor 97 is kept "ON"; (ii) capacitor 115 is not affected by the high state of gate 135; and (iii) capacitor 161 is slowly being charged through resistor 155.

If for some reason the current pulses stop, which will occur if there is no rotation sensed and no crossover switching, then the output of gate 135 will maintain its high state. As a result capacitor 161 will be charged and its potential will increase to a level higher than the threshold trigger level of gate 141. When the input of gate 141 is sufficiently high the astable multivibrator 103 is enabled and the output of gate 141 is locked in the low state dragging the input of 109 to go low and causing the output of gate 109 to be high, which in turn, turns on the transistor switch 107 resulting in disabling the drivers of the Hall IC and shutting off the coil current.

However at the moment that the output of gate 141 goes low capacitor 145 of the astable multivibrator 103 starts discharging through resistors 145 and 147. When the capacitor is sufficiently discharged the other input of 141 is low which causes the gate 141 to go high which in turn causes the output of gate 109 to go low which in turn shuts off transistor switch 107 thus enabling the output transistors the Hall IC. At this time current is expected to flow through the coils followed by movement of the rotor. The current sensing transistor 107 will sense this current pulse and the reset monostable 95 will discharge the capacitors 161 and 115. If there will be no rotor movement then capacitor 161 will charge to a high enough level to enable the astable multivibrator 103 again and the cycle will be repeated. If there is a rotor movement then the generated current pulses will occur in relatively short times so that the capacitor 161 will not be charged to a level sufficient to enable gate 141 and thus the astable multivibrator will remain idle.

While active, the astable multivibrator operates under two time constants: the capacitor discharges through resistors 149 and 147 in series and charges through diode 151 and resistor 149. Typical times of disabling the coil currents under locked rotor conditions are 1 sec and enabling time is 0.2 sec. The actual ON/OFF times are dependent on the RPM range of the motor but a ratio of 5–15% ON and 85–95% OFF times are practical time ratios.

Under normal motor running conditions capacitor 115 is discharged at every cross over switching of the output transistors and for very short time, whereas during the rest of the time until the next current pulse capacitor 115 is charging through the equivalent resistor network of resistors 119, 139 and 165. Depending on the time lapsed between two current pulses the capacitor 115 will be charged more for lower speeds or less for higher speeds. Manually the motor speed is set by the selection of the external resistor 165. Let us assume that a particular value of resistor 165 yields a motor speed N1. Under the set value of resistor 165 the capacitor 115 will charge every time to a value say V1, which is transferred to the gate of the MOSFET 93 through diode 121. This value of V1 less the voltage drop of diode 121 is stored in the capacitor 94 and corresponds to a specific channel resistance RDS1 of MOSFET 93.

Normally, increase of the power supply voltage results in increase of motor speed. If we assume that the speed were to increase, the current pulses would occur in shorter time periods and therefore capacitor 115 would not have sufficient time to charge to the voltage level V1 as before. As a result the voltage at the capacitor 94 would decrease and the channel resistance of the MOSFET 93 would increase. Increase of the channel resistance would in turn result in increase of the RC time constant of the monostable multivibrator 85 and thus slower motor speed.

Normally a reduction of the power supply voltage results in decrease of the motor speed. If we assume that the speed were to decrease, the current pulses would occur in longer time periods and therefore capacitor 115 would have more time to charge at a higher level than voltage level V1. As a result the voltage at the capacitor 94 would increase and the channel resistance would decrease. Decrease of the channel resistance would in turn result in decrease of the RC time constant of monostable multivibrator 85 and thus higher motor speed. It is understood that the maximum speed that can select cannot exceed the maximum allowable by the power supply. A current sink can implement the resistor network consisting of resistors 119, 139 and 165 so that the charging of capacitor 115 is better controlled.

Selecting the desired speed at nominal voltage and at a value equal to the desired speed at the lowest power supply voltage sets the dynamic range of constant speed of the circuit. For example if under nominal power supply voltage of 48V the maximum motor speed is 3000 RPM and the at 40V the motor can run with maximum speed of 2300 RPM, then we can set resistor 165 for a speed of 2300 RPM under power supply voltage of 48V. With this setting our motor will run at constant speed under power supply voltages from 40V to 56V or to the maximum possible operating voltage range of the motor. It must be noted that the circuit will maintain its set speed theoretically for any voltage level higher than its nominal voltage restricted only by the limitation of the maximum withstanding voltage of the transistors.

The constant speed feature offers:
1. Immunity to the motor speed due to power supply variations.
2. High static pressure when operated at nominal power supply voltages.

High Static Pressure Due to Constant Speed

A fan motor at free air (no airflow restricting obstacles) can deliver the maximum possible air volume (max CFM). However fan motors mostly operate under airflow restricting conditions. The speed of the fan motor is normally reduced as its airflow is reduced due to airflow restricting conditions. If the motor speed were to be kept the same at free air when maximum airflow is delivered, as well as under no airflow conditions, then the motor would be capable to have the highest static pressure possible for that motor. For example, an application requires a motor with speed of 3000 RPM at free air in order to deliver a given air volume. Without the constant speed feature this motor runs under maximum air restricting conditions at the speed of 2700 RPM resulting in certain pressure.

If this motor has the constant speed feature, the motor is designed to run under nominal voltage at the maximum speed of 3300 RPM and it is set by the external resistor 165 to run at 3000 RPM. When the fan motor encounters airflow restrictions it can maintain its original speed thus maintaining a high-pressure profile even under zero airflow conditions. The concept is similar to the case of car capable say to run on flat road at 130 Km/hr maximum and the driver using part of the car's power keeps a speed only of 100 Km/hr. However on an upgrade the driver is using the maximum power of the car to achieve also the speed of 100 Km/hr.

Many changes can be made in the above-described invention without departing from the intent and scope thereof. It is thereby intended that the enclosed description be read in the illustrative sense and not in the limiting sense. It is to be understood that the invention is not limited merely to the embodiments described herein, but encompasses all embodiments within the scope of the claims.

What is claimed is:

1. A constant speed PWM control circuit for a D.C. motor with electronic commutation, comprising:
    pulse control circuitry connected for supplying pulse width modulated (PWM) signals for controlling the excitation of a motor coil, said PWM signals defining the excitation period for power to be applied to said motor coil with current conduction in alternately opposite directions; and
    a coil driver circuit connected to said pulse control circuitry for supplying the power to said motor coil under the direction of said PWM signals from said pulse control circuitry;
    wherein said pulse control circuitry provides said PWM signals using a monostable multivibrator and a reset multivibrator connected to monostable multivibrator and an astable multivibrator connected to both said reset multivibrator and said monostable multivibrator.

2. The control circuit of claim 1 also including a Hall generator circuit connected to said motor for sensing rotor position as a function of rotating rotor magnetic field, said Hall generator circuit providing a synchronizing signal to said coil driver circuit.

3. The control circuit of claim 2 wherein said pulse control circuitry also includes a current sensing circuit for providing a signal when said coil current changes direction, said coil current sensing circuit being connect to both said reset and said monostable multivibrators for controlling their operating state and connected to said astable multivibrator for altering its operating state.

4. The control circuit of claim 3 wherein said astable multivibrator senses for an over voltage at the output of said coil driver circuit and when said over voltage is sensed said astable multivibrator turns off the running of both said reset and said monostable multivibrators through said connections thereto.

5. The control circuit claim 4 wherein said astable multivibrator establishes a wait period, wherein said wait period begins to run when said astable multivibrator turns off the running of both said reset and said monostable multivibrators, wherein further at the end of said wait period said astable multivibrator again senses for said over voltage.

6. The control circuit of claim 5 also including a sensing transistor connected to the coil driver circuit for temporarily disabling it in the presence of said astable multivibrator turn off signal.

7. The control circuit of claim 6 wherein said astable multivibrator no longer senses said over voltage, it enables the running of both said reset and said monostable multivibrators.

8. The control circuit of claim 7 wherein the coil driver circuit is a switching circuit having identical portions for separately applying current to a coil in each of opposing directions, said coil driver circuit being operated from PWM signals from the pulse control circuitry.

9. The control circuit of claim 8 wherein said monostable multivibrator has connected thereto an external resistance whose value affects the width of the PWM pulses provided from said monostable multivibrator, said external resistance being manually varied to set motor speed to a constant value.

10. The control circuit of claim 8 wherein said monostable multivibrator has connected thereto an external resistance whose value affects the width of the PWM pulses provided from said monostable multivibrator, said external resistance being automatically varied.

11. The control circuit of claim 10 wherein said external resistance changes to compensate for increases and decreases in motor speed.

12. The control circuit of claim 10 wherein said external resistance is a NTC thermister, whose effective resistance changes with temperature.

13. The control circuit of claim 10 wherein said external resistance is a MOE FET device whose internal resistance varies with voltage.

14. The control circuit of claim 10 wherein said external resistance includes a coil current pulse at cross-over detector, a connection to said reset multivibrator which gates said reset multivibrator to provide a count pulse for each cross-over, and integrator circuit connected to said reset multivibrator count pulse output for providing a saw tooth signal, a peak value detector connect integrator, a voltage difference circuit whose output compares the output of the peak value detector with a preset reference voltage, and a voltage controlled resistance connected to said monostable multivibrator to affect the width of said PWM signals provided thereby.

15. The control circuit of claim 14 wherein the input of said monostable multivibrator is shorted at full rated motor speed, and wherein said monostable multivibrator includes an internal time constant circuit, said time constant circuit driving the operational state of said first monostable multivibrator during the presence of said input short, thereby permitting the maintaining of a constant motor speed.

16. The control circuit of claim 15 wherein said current sensing circuit includes a current limiting transistor biased on and off by a signal from said Hall generator circuit.

17. A PWM control circuit for constant speed control in an electronically commutated DC motor comprising:
    a coil driver circuit for powering a motor coil bilaterally, with current alternating first in one direction and then in the opposite direction under the control of PWM signals, the width of said PWM signals determining motor speed and change in motor speed;
    a variable pulse width monostable multivibrator circuit connected to provide said PWM signals to said coil driver circuit;

a voltage controlled resistor circuit connected to said monostable multivibrator circuit, said resistor affecting the width of the PWM signals provided by said monostable multivibrator; and a current pulse cross-over detector circuit sensing said alternation cross-over of said coil current and providing a feedback signal to adjust said voltage controlled resistor circuit operation for compensating for changes in speed from a design speed setting;

wherein said coil driver circuit includes:
  a Hall sensor for sensing rotor physical position as a function of rotating motor magnetic field;
  a pair of Hall IC driver transistors switches, connected to the output of said monostable multivibrator, for alternately conducting, on an exclusive basis, under the control of said monostable multivibrator provided PWM signals, said pair of Hall IC driver transistor switches each receiving signals from said Hall sensor for synchronizing the switching states thereof with said rotor physical position,
  a coil driver circuit for applying power to excite a motor coil under the control of said Hall IC driver transistor switches through a connection therefrom.

18. The PWM control circuit of claim 17 wherein said variable pulse width monostable multivibrator circuit includes a resistor-capicitor (RC) time constant (TC) circuit, the value of said RC-TC circuit establishing the pulse width of the pulses provided by said monostable multiviabrator circuit; and wherein said voltage controlled resistor circuit forms the resistance in said mononstable multivibrator RC; and wherein said voltage controlled resistor circuit is connected to the output from a voltage difference circuit, said voltage difference circuit output being a function of an input voltage which is a function of instantaneous motor speed and a reference voltage representing design desired speed.

19. The PWM control circuit of claim 18 wherein said current pulse cross-over detector circuit includes: a coil current pulse detector, said coil current pulse occurring at cross-over in coil current directions; a reset monostable multivibrator connected to the output of said coil current pulse detector and roviding pulses whose frequency is indicative of coil pulses rate detected; an integrator circuit generating saw tooth waves whose peak value is as a function of the pulse frequency of said reset monstable multivibrator output pulses, said integrator circuit being connected to the output thereof; a peak value detector providing a voltage level output which voltage level is a function of the height of said saw tooth waves from said integrator circuit, said peak value detector being connected thereto, whereof said peak value detector is input to said voltage difference circuit.

* * * * *

UNITED STATES PATENT AND TRADEMARK OFFICE
CERTIFICATE OF CORRECTION

PATENT NO.    : 6,731,082 B2
DATED         : May 4, 2004
INVENTOR(S)   : Kosta L. Pelonis It is certified that error appears in the above-identified patent and that said Letters Patent is hereby corrected as shown below:

Column 12,
Line 34, replace "MOE FET" with -- MOSFET --

Column 13,
Line 12, replace "motor" with -- rotor --

Signed and Sealed this

Thirtieth Day of November, 2004

JON W. DUDAS
*Director of the United States Patent and Trademark Office*